United States Patent
Pape et al.

(10) Patent No.: US 12,408,265 B2
(45) Date of Patent: Sep. 2, 2025

(54) INTEGRATED CIRCUIT AND METHOD FOR DETECTING TAMPERING OF A PRINTED CIRCUIT BOARD

(71) Applicant: NXP B.V., Eindhoven (NL)

(72) Inventors: Lutz Pape, Pinneberg (DE); Nikita Veshchikov, Brussels (BE); Tobias Richard Erich Nink, Hamburg (DE)

(73) Assignee: NXP B.V., Eindhoven (NL)

( * ) Notice: Subject to any disclaimer, the term of this patent is extended or adjusted under 35 U.S.C. 154(b) by 199 days.

(21) Appl. No.: 18/340,985

(22) Filed: Jun. 26, 2023

(65) Prior Publication Data

US 2024/0431021 A1    Dec. 26, 2024

(51) Int. Cl.
*H05K 1/02* (2006.01)
*G06F 21/86* (2013.01)

(52) U.S. Cl.
CPC .......... *H05K 1/0275* (2013.01); *G06F 21/86* (2013.01)

(58) Field of Classification Search
CPC ....... H05K 1/0275; G06F 21/55; G06F 21/86; G06F 21/87; G06F 21/74; H03K 19/003; G08B 29/08; H01L 23/576
See application file for complete search history.

(56) References Cited

U.S. PATENT DOCUMENTS

| | | | |
|---|---|---|---|
| 5,502,831 A | 3/1996 | Grube et al. | |
| 6,246,970 B1 * | 6/2001 | Silverbrook | G06F 21/87 |
| | | | 702/191 |
| 6,496,119 B1 * | 12/2002 | Otterstedt | G06F 21/74 |
| | | | 361/45 |
| 7,443,176 B2 * | 10/2008 | McClure | G01K 7/015 |
| | | | 324/685 |
| 7,889,778 B2 * | 2/2011 | Marinet | G06K 19/073 |
| | | | 375/364 |
| 8,074,082 B2 | 12/2011 | Ozguz et al. | |
| 8,201,133 B2 * | 6/2012 | Cases | H05K 1/0225 |
| | | | 716/110 |
| 8,296,845 B2 * | 10/2012 | Derouet | G06F 21/87 |
| | | | 714/30 |
| 9,729,244 B2 * | 8/2017 | Alfiad | H04B 10/50575 |

(Continued)

FOREIGN PATENT DOCUMENTS

| | | |
|---|---|---|
| CN | 103926254 A | 7/2014 |
| CN | 205643626 U | 10/2016 |

(Continued)

*Primary Examiner* — Hosuk Song

(57) ABSTRACT

A method is provided for detecting tampering of a printed circuit board (PCB) using a tamper detection circuit implemented in an integrated circuit (IC) mounted on the PCB. In the method, a reference signal is generated and provided to a terminal of the IC. The terminal is connected to another circuit mounted on the PCB. A first response signal is received in response to the reference signal at the terminal. One or more characteristics of the first response signal are stored in a memory. The reference signal is again provided to the terminal of the integrated circuit and a second response signal is received at the terminal. The stored characteristics of the first response signal are compared to corresponding characteristics of the second response signal to generate a comparison result. The comparison result is used to detect tampering. When tampering is detected, an indication is provided.

20 Claims, 2 Drawing Sheets

(56) References Cited

U.S. PATENT DOCUMENTS

| | | |
|---|---|---|
| 9,876,645 B1 | 1/2018 | Ramalingam et al. |
| 10,466,275 B1 * | 11/2019 | Vundavalli .......... G01R 22/066 |
| 11,276,648 B2 * | 3/2022 | Apte .................... H01L 23/573 |
| 2018/0262353 A1 | 9/2018 | Riou |

FOREIGN PATENT DOCUMENTS

| | | |
|---|---|---|
| CN | 111272812 A | 6/2020 |
| EP | 3644210 A1 | 4/2020 |
| KR | 20220059530 A | 5/2022 |

* cited by examiner

INTEGRATED CIRCUIT AND METHOD FOR DETECTING TAMPERING OF A PRINTED CIRCUIT BOARD

BACKGROUND

Field

This disclosure generally relates to electrical circuits, and more particularly, to an integrated circuit and method for detecting tampering of a printed circuit board.

Related Art

Some attacks on an integrated circuit (IC) require the attacker to connect to electrical connections of a printed circuit board (PCB) onto which the IC and other components are mounted. The attacker can connect to terminals of the IC using, for example, IC pin probes or test clips. The probes may be connected to equipment used by the attacker. Using the probes and the equipment, the attacker may inject data into a device, record data that is transmitted between different processors on the same PCB, or monitor device activity such as, for example, power consumption to be used later for side-channel attacks.

Furthermore, for some attacks, hackers may remove one or more integrated circuits, or other components, from the PCB to analyze them separately or replace them with similar but malicious components that run different code. It is also possible to remove an IC from a PCB to insert another component between the PCB and the removed IC before reinstalling the IC. This is done for the ease of analysis of the IC, e.g., to be able to inject data into the IC to disrupt normal program execution, or to tap conductors more easily. Therefore, what is needed is an IC and method for detecting tampering of a PCB.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
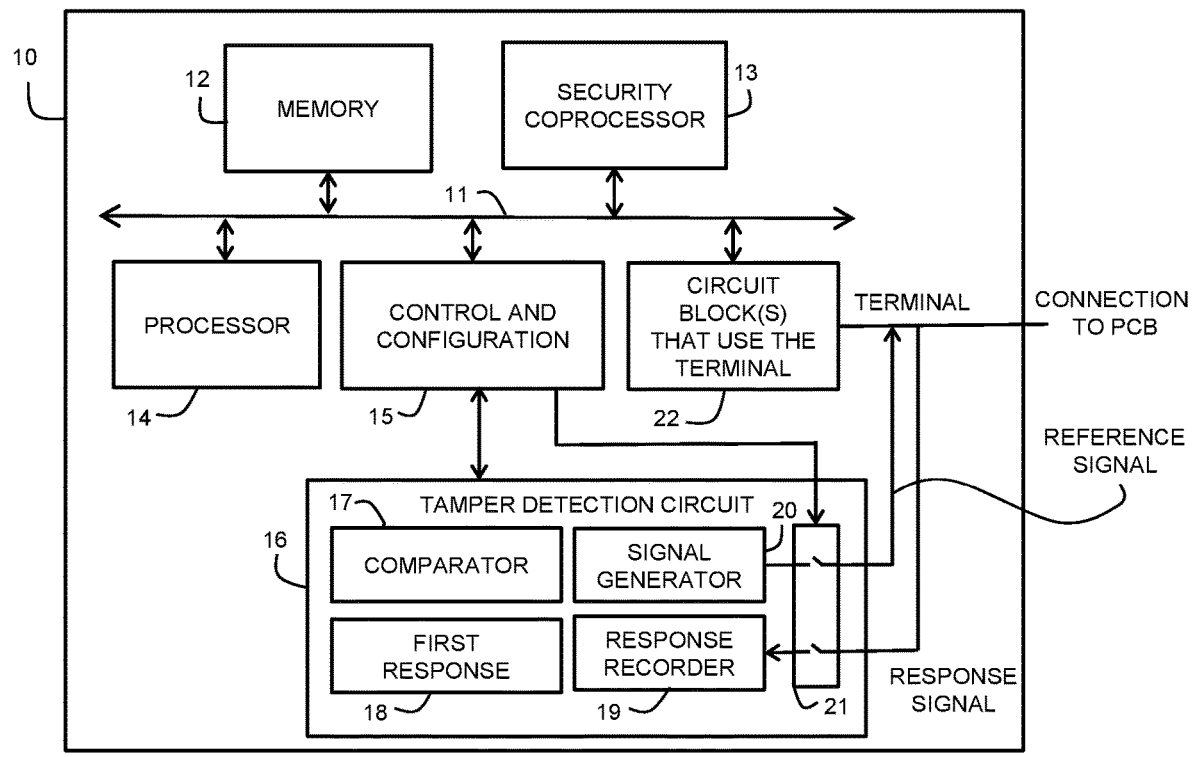
FIG. 1 illustrates an IC in accordance with an embodiment.

Generally, there is provided, a method and hardware for detecting tampering of an IC and other components on a PCB. During an initialization step of the method, a reference signal is generated by a tamper detection circuit that is implemented on the IC. The reference signal is provided to a terminal of the IC that connects to the PCB. The terminal is electrically connected to a functional circuit of the integrated circuit that may be used during normal operation of the IC. For example, the functional circuit may be an input/output (I/O) circuit that also connects to other circuitry in the IC and to an external circuit using a conductor or trace on the PCB. A first response signal to the reference signal is received by the tamper detection circuit at the terminal. A response recorder stores the first response signal, and/or stores one or more characteristics of the first response signal in a memory of the IC. The memory may be, for example, a memory that provides persistent storage such as a non-volatile memory, e.g., flash, or a memory connected to an uninterruptible power supply. The one or more characteristics of the first response signal are considered to be in the analog domain as contrasted to the digital domain. The characteristics of the first response signal includes one or more of amplitude, period, frequency, and phase of the first response signal. Also, the characteristics may include a Fourier transform performed on the response signal and the coefficients used to describe the first response signal. The characteristics may also include any other attribute or signal analysis that would be useful to describe the first response signal. The characteristics of the first response signal may be affected by various factors. These factors include, but are not limited to, physical attributes of a conductor such as, e.g., resistance, capacitance, and inductance, and other circuits connected to the terminal.

During a verification step, the reference signal is again provided to the terminal of the IC. A second response signal is received in response to the reference signal. The stored one or more characteristics of the first response signal is compared to corresponding one or more characteristics of the second response signal by a comparator in the tamper detection circuit to generate a comparison result. A change between the characteristics of the first and second response signals may be an indication something changed regarding the connection to the terminal, because of, e.g., tampering by an attacker. For example, the characteristics of the second response signal may be changed from the characteristics of the first response signal because, for example, there has been a change in the physical characteristic of the conductor or trace on the PCB such as, length, the addition of a soldered wire connection, routing, current carrying capacity, etc. If tampering is detected, an indication of the tampering is provided. In response to the indication, the IC may react to the tampering by, for example, throwing an interrupt to stop execution or some other action, sending an alert message to a server in the cloud, and disabling some functionalities of the IC.

In accordance with an embodiment, there is provided, a method including: during an initialization step: generating a reference signal; providing the reference signal to a terminal of an integrated circuit, wherein the terminal is electrically connected to a functional circuit of the integrated circuit and to a printed circuit board (PCB) connection external to the integrated circuit; receiving a first response signal at the terminal in response to the reference signal; storing one or more characteristics of the first response signal; and during a verification step: providing the reference signal to the terminal of the integrated circuit and receiving a second response signal; comparing the one or more characteristics of the stored first response signal to corresponding one or more characteristics of the second response signal to generate a comparison result; determining that the comparison result indicates tampering with an electrical connection on the PCB; and providing an indication of the tampering. The determining that the comparison result indicates tampering may further include determining that the comparison result compares favorably to a predefined similarity threshold indicating that the first response signal and the second response signal are considered the same. The comparing the one or more characteristics of the first response signal with the one or more second response signals may be performed during a boot up process of the integrated circuit. The electrical connection between the functional circuit of the integrated circuit and the PCB may be for connecting a debugger to the integrated circuit. The comparing the one or more characteristics of the first response signal with the one or more characteristics of the second response signal may be performed when requested by a processor of the integrated circuit. The comparing the one or more characteristics of the first response signal with the one or more characteristics of the second response signal may be performed at randomly generated time intervals. Providing the indication of the tampering may further include generating an interrupt in the integrated circuit. The one or more characteristics may include one or more of, amplitude, period, frequency, phase, and a Fourier transform performed on each of the first and second response signals. The comparing of the one or more characteristics of the first response signal with the one or more characteristics of the second response signal may occur at equally spaced intervals. The comparing of the one or more characteristics of the first response signal with the one or more characteristics of the second response signal may further include comparing the characteristics of multiple stored first response signals with the characteristics of multiple second response signals through a range of different frequencies or waveform shapes.

In another embodiment, there is provided, an integrated circuit (IC) including: a hardware functional circuit having a terminal configured to be electrically connected to a circuit external to the IC; a memory configured to store one or more characteristics of a first response signal received at the terminal when the terminal is connected to the circuit external to the IC, wherein the first response signal is received in response to a transmitted reference signal; and a tamper detection circuit configured to compare corresponding one or more characteristics of a second response signal received at the terminal of the hardware functional circuit with the one or more characteristics of the first response signal to produce a comparison result, wherein in response to the tamper detection circuit determining that the comparison result indicates that the electrical connection to the external circuit has been tampered with, providing an indication of the tampering. The external circuit may be a printed circuit board. The memory may be a non-volatile memory. The hardware functional circuit may be an input/output (I/O) port. Determining that the comparison result indicates that the electrical connection has been tampered with may further include determining that the comparison result compares favorably to a predefined similarity threshold indicating that the first response signal and the second response signal are considered the same. The one or more characteristics may include one or more of, amplitude, period, frequency, phase, and a Fourier transform performed on each of the first and second response signals. Providing the indication of the tampering may further include generating an interrupt in the IC.

In yet another embodiment, there is provided, a method including: providing a reference signal to a terminal of an integrated circuit, wherein the terminal is electrically connected to a functional circuit of the integrated circuit and to a printed circuit board (PCB) connection external to the integrated circuit; receiving a first response signal in response to the reference signal at the terminal of the integrated circuit; recording a plurality of predetermined characteristics of the first response signal; subsequently providing the reference signal to the terminal of the integrated circuit and receiving a second response signal at the terminal in response; comparing the plurality of predetermined characteristics of the first response signal to a plurality of corresponding predetermined characteristics of the second response signal to generate a comparison result; determining that the comparison result indicates tampering with an electrical connection on the PCB; and providing an indication of the tampering. The comparing the predetermined characteristics may include comparing one or more of, amplitude, period, frequency, phase, and a Fourier transform performed on each of the first and second response signals. The recording the predetermined characteristics of the first response signal may further include storing the predetermined characteristics in a memory of the integrated circuit.

FIG. 1 illustrates IC 10 in accordance with an embodiment. In one embodiment, IC 10 is mounted on a PCB and electrically connected to other components on the PCB. Integrated circuit 10 can be any type of IC that is susceptible to unwanted tampering. For example, in one embodiment, IC 10 is a system on a chip (SoC), a microprocessor, microcontroller, field programmable gate array (FPGA), application-specific integrated circuit (ASIC), or similar device. As shown in FIG. 1, IC 10 includes bus 11 coupled to memory 12, security coprocessor 13, processor 14, control and configuration circuit 15 coupled to tamper detection circuit 16, and other circuit blocks 22. In other embodiments, IC 10 may be different.

Memory 12 may be any kind of memory, such as for example, one or more of L1, L2, or L3 cache or system memory. Memory 12 may include volatile memory such as static random-access memory (SRAM) or dynamic RAM (DRAM), and/or may include non-volatile memory such as flash memory, or other volatile or non-volatile memory. In one embodiment, memory 12 includes a portion of non-volatile memory that can store first response 18. Also, a portion of memory 12 may be used to store characteristics of response signals in accordance with an embodiment. Also, memory 12 may be implemented in a secure element or other type of secure storage.

Processor 14 may include any hardware circuit capable of executing instructions stored in memory 14. For example, processor 14 may execute the instructions of an operating system (OS) or applications for a computer, smart phone, or other device. Also, processor 14 may execute a control application for an embedded application. Processor 14 may be implemented in a secure hardware element and may be tamper resistant. Security coprocessor 13 may be the same or similar to processor 14 except that security coprocessor 13 is specifically provided to execute security related applications for IC 10. For example, processor 13 may also execute other applications such as encryption and/or decryption algorithms. In another embodiment, security coprocessor 13 may be omitted and processor 14 perform the functions of security coprocessor 13.

Tamper detection circuit 16 includes comparator 17, first response 18, response recorder signal generator 20, and selection circuit 21. Tamper detection circuit 16 is connected to an external terminal labeled "TERMINAL", and to control and configuration circuit 15. Control and configuration circuit 15 controls the operation and functions of tamper detection circuit 16. The external terminal (TERMINAL) may be an input terminal, output terminal, or combination input/output (I/O) terminal connected to an I/O port. Circuit block 22 is provided as an example of a hardware block, such as the I/O port, having pins or other terminal types for communicating with other components on or off of the PCB. The I/O port may be a general purpose I/O or input and output buffers for a hardware module that communicates externally to IC 10, such as a universal asynchronous receiver-transmitter (UART) module. Circuit block 22 may be coupled to one or more other circuits on IC 10 via bus 11. For better results, tamper detection circuit 16 may be placed on the IC relatively near the terminal, or pin, to be monitored. In another embodiment, multiple tamper detection circuits 16 may be provided to detect tampering of other terminals. The multiple tamper detection circuits 16 may all use the same control and configuration circuit 15 or use one control and configuration circuit 15 per tamper detection circuit 16. Note that only one tamper detection circuit 16 is shown in the figures.

Figure 2:
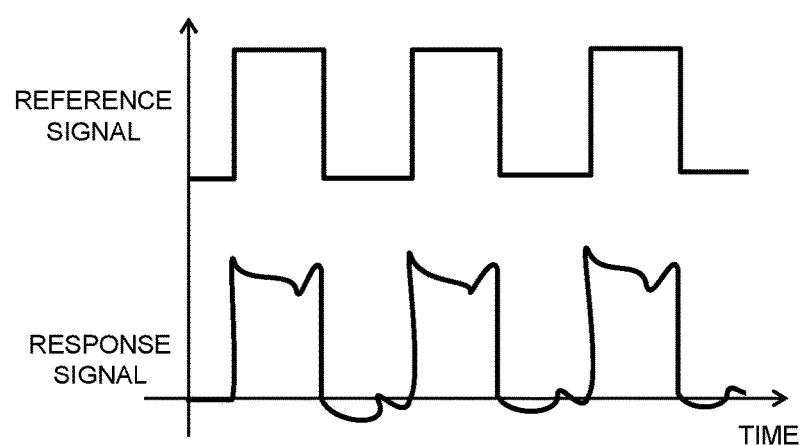
FIG. 2 illustrates waveforms of an example reference signal and a response signal.

Tamper detection circuit 16 compares the signals in the analog domain. That is, when a response signal is received from the terminal, a specific "shape" of the signal depends on the physical properties of the conductor and circuit elements it is connected to. Each conductor, such as a wire or a trace on the PCB, has several physical properties associated with it, for example, resistance, capacitance and inductance. The resistance, capacitance, and inductance of the conductor are affected by factors such as the length of the conductor, type of material it is formed from, cross-section of the conductor as well as the path that it takes on the PCB, and proximity to other conductors and components. These factors will influence the physical properties of the conductor and have an influence on characteristics of the response signal such as, e.g., amplitude, period, frequency, phase, and shape of the signal caused by distortion. These characteristics are monitored and used by tamper detection circuit 16 to detect tampering of the PCB. In other embodiments, other characteristics may be used. Also, a Fourier transform may be performed on the response signals and the coefficients used to describe the first and second response signals. In addition, rise and fall times of a signal, or the existence of ringing may be signal characteristics to monitor. The description of the response signals may be used for the comparison using comparator 17. FIG. 2 illustrates simple example waveforms of a reference signal and a response signal according to an embodiment. FIG. 2 shows a square wave, but other waveform shapes are possible depending on the application, such as sawtooth, triangle, sine, pulse, etc.

Usually designers take much care in the design of a PCB to ensure all these characteristics are in the desired range of values. There are many factors to consider in the design of the PCB. For example, one factor to be considered is signal reflection at the ends of the conductors that can result in a portion of a transmitted signal being reflected back and reducing a signal's integrity. Typically, impedance matching is performed to reduce reflections, thus improving signal integrity so that the signal on the receiving end of a conductor is more like the transmitted signal. Any change in the conductor, such as additional length, the addition of a probe, additional soldered connection, or de-soldered connection will affect signals transmitted on it and the signal will not have the same characteristics it did before the change in the conductor. It is nearly impossible to completely get rid of all the small distortions of the signal and the signal will always have some "imperfections" that are usually below a distortion threshold that is used to reliably distinguish, e.g., a logic "1" from a logic "0" in a digital signal. Additionally, the strength of these distortions can also depend on the shape of the transmitted signal, as provided by, e.g., frequency and how quickly a signal transitions from a low to high or high to low voltage. According to an embodiment, the changing shape and characteristics of a signal on a conductor are used by tamper detection circuit 16 to detect possible PCB modifications due to tampering.

Still referring to FIG. 1, signal generator 20 is selectively connected to the TERMINAL via selection circuit 21 for providing a reference signal labeled "REFERENCE SIGNAL" to the TERMINAL. Response recorder 19 of tamper detection circuit 16 is selectively connected to the TERMINAL through selection circuit 21. The response signal labeled "RESPONSE SIGNAL" is received in response to the REFERENCE SIGNAL. Note that in one embodiment, there may be additional intervening components, such as a bandpass filter (not shown) to allow monitoring of a particular frequency more easily without a lot of spurious signals. Selection circuit 21 is controlled by control and configuration circuit 15.

There are two modes of operation of tamper detection circuit 16: an initialization mode and a verification mode. During the initialization mode, a reference signal is generated by signal generator 20. In one embodiment, the reference signal is of the type and frequency expected to be conducted to the monitored terminal, e.g., square ware. Selection circuit 21 connects signal generator 20 to the TERMINAL and the reference signal is transmitted to the TERMINAL. The selection circuit 21 connects response recorder 19 to the TERMINAL. A first RESPONSE SIGNAL, which is in response to the transmitted REFERENCE SIGNAL, is received by response recorder 19 and predetermined characteristics of the first RESPONSE SIGNAL are stored. When tamper detection circuit 16 is not being used, selection circuit 21 disconnects tamper detection circuit 16 from the TERMINAL. Control and configuration circuit 15 controls the timing of selection circuit 21 and the particular signal characteristics to be monitored. In one embodiment, the predetermined characteristics of the first RESPONSE SIGNAL are stored in non-volatile register FIRST RESPONSE 18. In another embodiment, the characteristics of first RESPONSE SIGNAL are stored in a non-volatile portion of memory 12.

During the verification mode, the same REFERENCE SIGNAL is resent to the TERMINAL by signal generator 20 via selection circuit 21. A second RESPONSE SIGNAL is received by response recorder 19 via selection circuit 21. Predetermined characteristics of the second RESPONSE SIGNAL corresponding to the characteristics of the first response signal are compared to the stored characteristics of the first RESPONSE SIGNAL by comparator 17 to produce a comparison result. It is expected that the second RESPONSE SIGNAL would be similar to the stored first RESPONSE SIGNAL in response to the same reference signal, except for small changes due to factors such as temperature changes and noise. By way of example, the noise may be caused by mechanical switching on the PCB. If the characteristics of the second RESPONSE SIGNAL compares favorably to the characteristics of the first RESPONSE SIGNAL as determined by a predefined similarity threshold, then the first and second response signals are considered to be substantially the same and it is assumed that nothing has changed on the PCB. However, if the characteristics of the second RESPONSE SIGNAL are different from the characteristics of the first RESPONSE SIGNAL, that is, does not compare favorably to the predefined similarity threshold, then tampering of the PCB may be assumed. The predefined similarity may be, e.g., a voltage level of the signal, or one or more other characteristics that are being monitored. For example, if a difference in voltage level between the first and second response signals is above a predetermined threshold difference, then tampering is assumed. The tampering may be, for example, a probe or clip attached to the terminal, or a component that is replaced, modified, removed, or added. IC 10 may even have been placed on a different PCB. When tamper detection circuit 16 detects an issue it can send an indication of the tampering, such as an alert to a security subsystem, or trigger an interrupt or perform another action that was defined by the software and/or hardware developers of the PCB.

To cope with a PCB that has switches, it is possible to record several responses corresponding to different positions of the switches and later compare characteristics of a current response signal with several previously recorded response signals.

In one embodiment, several thresholds may be predefined and several levels of alerts for the detection of tampering, e.g., high, medium, low and OK may be implemented. The several levels of alerts can be used to trigger different reactions of the system depending on the severity, frequency, or other conditions of the specific pin or terminal that was detected to have been probed or modified.

The verification done by tamper detection circuit 16 can be performed at different times during operation of the PCB. For example, because it is likely an attacker will do any modifications while the device is off, tamper detection may be performed when the system is first booted up. Also, during boot the system is being initialized and not yet being used. Thus, there are less chances that pins are already busy with other signal transmissions. Tamper detection may be performed on request of another system such as a main processor, the operating system or a secure subsystem. The advantage is that such tests can be done just before some particularly important security operation is performed such as encryption or manipulation of sensitive data. Moreover, the system knows when pins are in use and when they are not in use and will be able to request to perform tampering detection when pins being monitored are not used. The time for tamper detection may be determined randomly or at equally spaced intervals. Because an attacker can, in theory, attach probes to the device at any time, using the random or regularly occurring checks may have a higher chance of detecting the attacker's actions. Finally, tamper detection can be performed continuously.

One IC can potentially have as many tamper detection circuits as it has pins. However, depending on how the IC is connected to the PCB and what components are connected to the other end of a conductor on the PCB, some of the probe detector modules may have to be disabled, e.g., because another component is too sensitive and may be damaged by the signals sent by tamper detection circuit 16. Alternatively, some pins or terminals may be constantly used such that tamper detection circuit 16 will interfere with their normal use. Thus, with respect to some terminals on the IC, tamper detection circuit 16 may be disabled by the control and configuration circuit 15. Note, that if one of the pins of the IC is not used then it may be a good pin for tamper detection circuit 16 to monitor in a continuous mode. For example, debug pins on a SoC may be used for debugging the SoC during development and testing, but are not connected to anything in a final product that includes the SoC.

Providing a reference signal at different frequencies may give different response signals. Thus, tamper detection circuit 16 may be configured by control and configuration circuit 15 to use signals at a specific frequency that are more appropriate for the detection and provide better results in a specific environment on a given PCB. Note that it is also possible for tamper detection circuit 16 to monitor a range of frequencies and record several first response signals during initialization, or to choose one first response signal that provides the most distinguishable second response signals during verification mode.

The use of multiple tamper detection circuits 16 to monitor multiple pins may be done in parallel or sequentially. Note, that parallel testing is faster but parallel testing may be more difficult because interference can be produced by, e.g., capacitive coupling between adjacent conductors on the PCB that run very close to each other.

In one embodiment, control and configuration circuit 15 may direct the storage and use of only one first response signal per tamper detection circuit 16 and never change it. However, some ICs may be used in multiple different configurations. For example, an IC may be moved from one PCB to another PCB, or a PCB may allow modifications such as the addition of another IC from time to time, for example, the addition of additional memory such as a dual in-line memory module (DIMM) or single in-line memory module (SIMM) that can be plugged into a socket. In this case, it may be desirable to delete the old first response signal and record a new first response signal as a re-initialization of tamper detection circuit 16. For security purposes, control and configuration circuit 15 may be responsible for authorizing or forbidding a new initialization of tamper detection circuit 16. A cryptographic authentication protocol may be used to prove that the new initialization request is genuine.

In another embodiment of an I/O pin that is in use by the IC, tamper detection circuit 16 does not have to transmit its own generated reference signal, but may use the signals transmitted by the IC. The characteristics of the signals in these transmissions may be compared to stored response signal characteristics. However, in this case tamper detection circuit 16 may have to take into account that the specific signal transmitted is not necessarily the same every time. That is, the signal characteristic may depend on the data that is being transmitted and from where the data is being transmitted. This provides an advantage of almost continuous monitoring while not keeping the pin or terminal busy just for the verification.

Many ICs have a debugger port that is not present in the final product even though the PCB still has all the conductors that allowed a debugger to be connected. A debugger port is one of the main targets of hackers for accessing to an IC. Thus, one of the best locations for tamper detection is the pins of the IC that are used for connecting the debugger.

Figure 3:
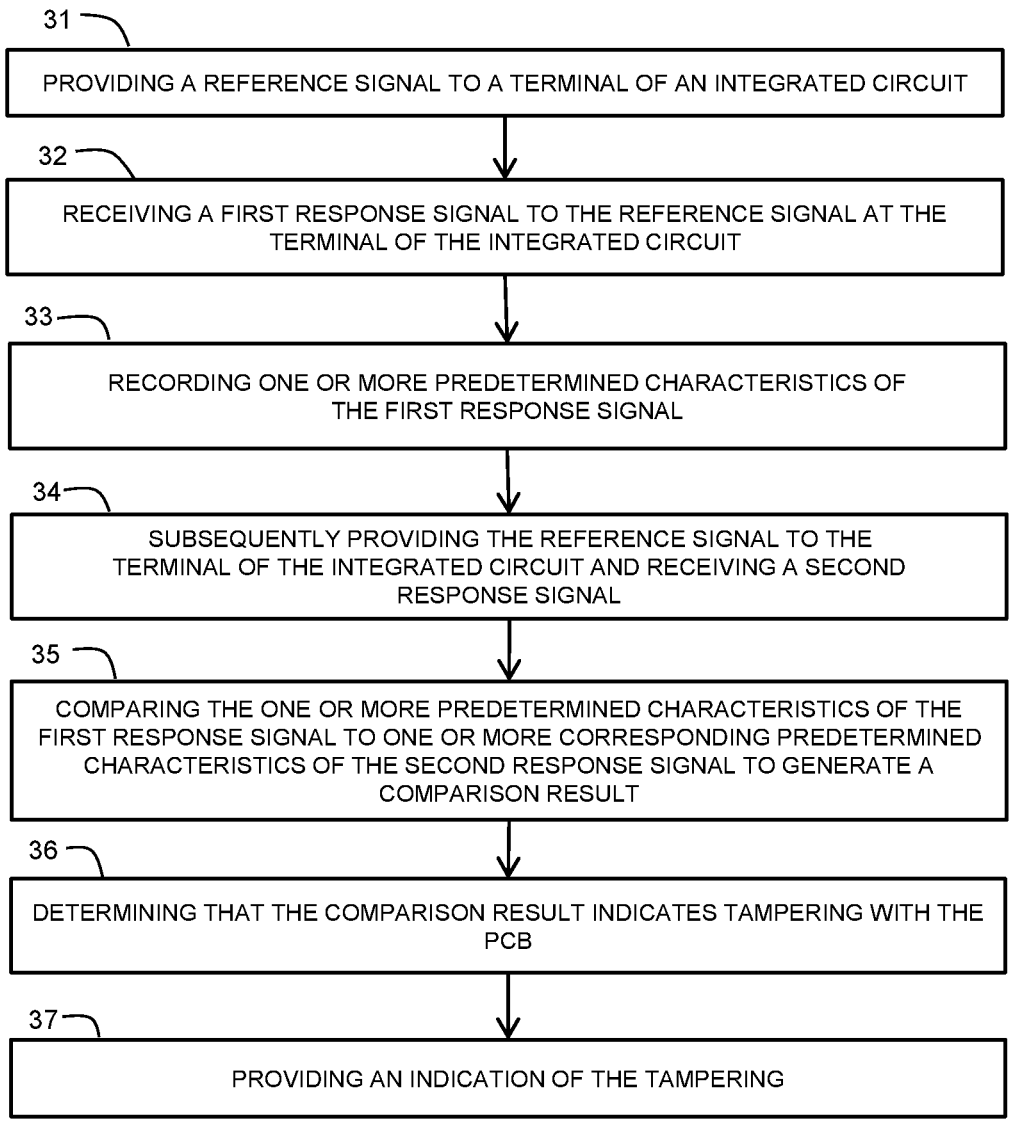
FIG. 3 illustrates a method for detecting tampering of a connection on a PCB.

FIG. 3 illustrates method 30 for detecting tampering of a connection on a PCB. The method may be performed using a tamper detection circuit as shown in FIG. 1. Method 30 begins at block 31. At block 31, a reference signal is provided to a terminal of an IC such as IC 10 in FIG. 1. The reference signal may be provided during an initialization mode of the IC. At block 32, a first response signal to the reference signal is received at the terminal of the IC. At block 33, one or more predetermined characteristics of the first response signal is recorded, or stored. The predetermined characteristics may be stored in a first response register 18 or may be stored in memory 12. Block 33 completes the steps of the initialization mode of the tamper detection circuit. After the initialization, the tamper detection circuit can be used in a verification mode to detect tampering of the IC. Block 34 begins the verification mode. At block 34, the reference signal is again provided to the terminal being monitored, and a second response signal is received. At block 35, the predetermined characteristics of the second response signal are compared with corresponding predetermined characteristics of the first response signal to generate a comparison result. At block 36, it is determined if the comparison result indicates that the PCB is being tampered with. The determining may be performed using a similarity threshold to determine if a difference in the one or more predetermined characteristics between the first and second response signals indicates tampering. If the comparison result indicates a likelihood of tampering, at block 37, an indication is provided.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The terms "circuit" and "circuitry" may refer to hardware, software, or a combination of hardware and software.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method comprising:
   during an initialization step:
   generating a reference signal;
   providing the reference signal to a terminal of an integrated circuit, wherein the terminal is electrically connected to a functional circuit of the integrated circuit and to a printed circuit board (PCB) connection external to the integrated circuit;
   receiving a first response signal at the terminal in response to the reference signal;
   storing, in a memory of the integrated circuit, one or more characteristics of the first response signal, wherein the one or more characteristics of the first response signal include any one or more attributes that describe the first response signal; and
   during a verification step:
   providing the reference signal to the terminal of the integrated circuit and receiving a second response signal;
   comparing, by a comparator circuit of the integrated circuit, a first characteristic of the one or more characteristics of the first response signal to a corresponding characteristic of one or more characteristics of the second response signal to generate a comparison result that indicates a difference between the first characteristic and the corresponding characteristic;
   determining, by the integrated circuit, that the comparison result indicates tampering with an electrical connection on the PCB when the difference between the first characteristic and the corresponding characteristic meets a criterion; and
   providing, by the integrated circuit, an indication of the tampering when the comparison result indicates the tampering.

2. The method of claim 1, further comprising, during the verification step, determining that the comparison result does not indicate tampering when the comparison result compares favorably to a predefined similarity threshold indicating that the first response signal and the second response signal are considered the same.

3. The method of claim 1, wherein the comparing the one or more characteristics of the first response signal with the one or more second response signals is performed during a boot up process of the integrated circuit.

4. The method of claim 1, wherein the electrical connection between the functional circuit of the integrated circuit and the PCB is for connecting a debugger to the integrated circuit.

5. The method of claim 1, wherein the comparing the one or more characteristics of the first response signal with the one or more characteristics of the second response signal is performed when requested by a processor of the integrated circuit.

6. The method of claim 1, wherein the comparing the one or more characteristics of the first response signal with the one or more characteristics of the second response signal is performed at randomly generated time intervals.

7. The method of claim 1, wherein providing the indication of the tampering further comprises generating an interrupt in the integrated circuit.

8. The method of claim 1, wherein the one or more characteristics includes one or more of, amplitude, period, frequency, phase, and a Fourier transform performed on each of the first and second response signals.

9. The method of claim 1, wherein the comparing of the one or more characteristics of the first response signal with the one or more characteristics of the second response signal occurs at equally spaced intervals.

10. The method of claim 1, wherein the comparing of the one or more characteristics of the first response signal with the one or more characteristics of the second response signal further comprises comparing the characteristics of multiple stored first response signals with the characteristics of multiple second response signals through a range of different frequencies or waveform shapes.

11. The method of claim 1, wherein the criterion used in determining that the comparison result indicates tampering is that the difference between the first characteristic and the corresponding characteristic is above a predetermined threshold difference.

12. An integrated circuit (IC) comprising:
a hardware functional circuit having a terminal configured to be electrically connected to a circuit external to the IC through an electrical connection on a printed circuit board (PCB);
a memory configured to store one or more characteristics of a first response signal received at the terminal when the terminal is connected to the circuit external to the IC, wherein the one or more characteristics of the first response signal include any one or more attributes that describe the first response signal, and wherein the first response signal is received in response to a transmitted reference signal; and
a tamper detection circuit including a comparator circuit that is configured to compare a first characteristic of the one or more characteristics of the first response signal with a corresponding characteristic of one or more characteristics of a second response signal received at the terminal of the hardware functional circuit to produce a comparison result that indicates a difference between the first characteristic and the corresponding characteristic, wherein the tamper detection circuit is further configured to determine that the comparison result indicates tampering with the electrical connection on the PCB when the difference between the first characteristic and the corresponding characteristic meets a criterion, and wherein in response to the tamper detection circuit determining that the comparison result indicates that the electrical connection to the external circuit has been tampered with, providing an indication of the tampering.

13. The IC of claim 12, wherein the memory is a non-volatile memory.

14. The IC of claim 12, wherein the hardware functional circuit is an input/output (I/O) port.

15. The IC of claim 12, wherein the tamper detection circuit is further configured to determine that the comparison result does not indicate tampering when the comparison result compares favorably to a predefined similarity threshold indicating that the first response signal and the second response signal are considered the same.

16. The IC of claim 12, wherein the one or more characteristics includes one or more of, amplitude, period, frequency, phase, and a Fourier transform performed on each of the first and second response signals.

17. The IC of claim 12, wherein providing the indication of the tampering further comprises generating an interrupt in the IC.

18. A method comprising:
providing a reference signal to a terminal of an integrated circuit, wherein the terminal is electrically connected to a functional circuit of the integrated circuit and to a printed circuit board (PCB) connection external to the integrated circuit;
receiving a first response signal in response to the reference signal at the terminal of the integrated circuit;
recording a plurality of predetermined characteristics of the first response signal, wherein the plurality of predetermined characteristics of the first response signal include any one or more attributes that describe the first response signal;
subsequently providing the reference signal to the terminal of the integrated circuit and receiving a second response signal at the terminal in response;
comparing, by a comparator circuit of the integrated circuit, each of the plurality of predetermined characteristics of the first response signal to each of a plurality of corresponding predetermined characteristics of the second response signal to generate a comparison result that indicates differences between the plurality of predetermined characteristics of the first response signal and the corresponding predetermined characteristics of the second response signal;
determining that the comparison result indicates tampering with an electrical connection on the PCB when the differences meet a criterion; and
providing an indication of the tampering when the comparison result indicates the tampering.

19. The method of claim 18, wherein the comparing the predetermined characteristics includes comparing one or more of, amplitude, period, frequency, phase, and a Fourier transform performed on each of the first and second response signals.

20. The method of claim 18, wherein the recording the predetermined characteristics of the first response signal further comprises storing the predetermined characteristics in a memory of the integrated circuit.

* * * * *